United States Patent [19]

Liebermann

[11] Patent Number: 5,068,115

[45] Date of Patent: Nov. 26, 1991

[54] METHOD FOR CLEANING EDIBLE OILS USING AN IMMERSIBLE PACKET CONTAINING CITRUS PEELS AND A PACKET FOR CLEANING EDIBLE OILS

[75] Inventor: Benno E. Liebermann, Louisville, Ky.

[73] Assignee: Beltec International, Louisville, Ky.

[21] Appl. No.: 638,479

[22] Filed: Jan. 3, 1991

[51] Int. Cl.$^5$ .............................................. A23D 9/00
[52] U.S. Cl. ...................................... 426/77; 210/501; 210/916; 426/78; 426/84; 426/113; 426/330.6; 426/541; 426/542; 426/438
[58] Field of Search ...................... 426/77, 78, 84, 541, 426/542, 438, 113, 330.6; 210/DIG. 8, 501, 916, 758

[56] References Cited

U.S. PATENT DOCUMENTS

| | | | |
|---|---|---|---|
| 2,768,084 | 10/1956 | Griffith et al. | 99/163 |
| 3,210,193 | 10/1965 | Martin | 426/438 |
| 3,649,290 | 3/1972 | Angold | 426/438 |
| 3,947,602 | 3/1976 | Clewell | 426/438 |
| 4,052,319 | 10/1977 | Friedman | 210/DIG. 8 |
| 4,115,597 | 9/1978 | Pellar | 426/541 |
| 4,235,795 | 11/1980 | Cohen | 210/DIG. 8 |
| 4,330,564 | 5/1982 | Friedman | 426/417 |
| 4,349,451 | 9/1982 | Friedman | 252/190 |
| 4,363,823 | 12/1982 | Kimura | 426/438 |
| 4,604,203 | 8/1986 | Kyle | 210/DIG. 8 |
| 4,768,426 | 9/1988 | Nett | 426/438 |
| 4,803,077 | 2/1989 | Mitsuhashi et al. | 424/439 |
| 4,806,374 | 2/1989 | Willemse | 426/330.6 |
| 4,880,652 | 11/1989 | Regutti | 426/438 |
| 4,913,921 | 4/1990 | Schroeder et al. | 426/321 |
| 4,913,922 | 4/1990 | Hawkes | 426/438 |
| 4,957,758 | 9/1990 | Dreyftholt | 426/330.6 |

FOREIGN PATENT DOCUMENTS

| | | | |
|---|---|---|---|
| 51-37330 | 10/1976 | Japan | 426/438 |
| 51-37331 | 10/1976 | Japan | 426/438 |
| 1-34587 | 7/1989 | Japan | 426/438 |

*Primary Examiner*—Carolyn Paden
*Attorney, Agent, or Firm*—Wallenstein, Wagner & Hattis, Ltd.

[57] ABSTRACT

The invention is a packet for the cleansing of edible oils, and a method of using that packet. The packet comprises a sealed enclosure formed of a porous or perforated, polymeric material. The ground rind from a fruit, such as granulated grapefruit peelings, are inserted into that enclosure. The method comprises immersion of the porous or perforated, fruit peeling-containing polymeric packet into the edible oil. The porous or perforated packet is retained in the edible oil for at least five minutes. During the time that the packet is immersed, the edible oil can flow through the porous or perforated polymeric packet and contact the citrus peelings within that packet. At the end of the appropriate time period, the porous or perforated polymeric packet is removed from the edible oil.

26 Claims, 1 Drawing Sheet

METHOD FOR CLEANING EDIBLE OILS USING AN IMMERSIBLE PACKET CONTAINING CITRUS PEELS AND A PACKET FOR CLEANING EDIBLE OILS

DESCRIPTION

1. Technical Field

This invention relates to a method and device for extending the life of heated edible cooking oils. In particular, the invention relates to a packet containing the ground rind of a fruit which, by its placement in edible oil for a predetermined length of time, acts as an antioxidant and cleans the oil.

2. Background of the Invention

This invention provides a solution to the problem of rapid degeneration of edible oils, and the waste disposal problem resulting from that degeneration. This problem is especially acute in the restaurant and commercial food preparation industries, which use large amounts of edible oils for deep frying.

Deep frying oils and shortenings include those edible oils derived from corn, soybeans, palm, tallow and other vegetable and animal sources. Chemical antioxidants are typically placed into these oils and shortenings by their manufacturers. However, these chemicals are intended to preserve the shelf life of oils and shortenings at room temperature, and do not satisfactorily address the problems of stability at the elevated temperatures at which these oils are used.

This is because the chemical antioxidants used by manufacturers do nothing to counter the free fatty acids generated by the introduction of animal fats into the heated cooking oils. These animal fats increase the rate of formation of free fatty acids. In addition, heated cooking oil is shocked when a frozen or room temperature food product containing animal fat is introduced into that oil. This initial shocking of the oil forms eddy currents around the immersed food product, causing bubbling at the oil surface. Such surface bubbling only enhances the rapid oxidation of the cooking oil, which in turn results in rapid generation of free fatty acids. As a result, the preadded chemical antioxidants are quickly overwhelmed. Hence, it is necessary to introduce an additional antioxidant to retard accelerated generation of free fatty acids.

The chemical antioxidants typically used by manufacturers of oils and shortenings include butylated hydroxyanisole, butylated hydroxy toluene and propyl gallate. Known organic antioxidants include ascorbic acid and volatile compositions of essential oils. Spices such as allspice, nutmeg, cinnamon, clove and sage contain natural oils, and are also known antioxidants. However, as discussed above, antioxidants used by oil manufacturers do nothing to address the problem of oil deterioration during frying.

During frying, these oils also become unsuitable due to the generation of peroxides, and due to an increase in their iodine values. However, the free fatty acids formed are primarily responsible for initiating oxidation of the oil.

Methods of cleaning or reclaiming edible oils so as to extend their lives include mechanical filtration. Other methods are described in several issued United States patents.

For example, U.S. Pat. No. 2,768,084, was issued to Griffith et al. on Oct. 23, 1956, and is entitled "OIL SOLUBLE SYNERGISTIC ANTIOXIDANT." This patent discloses the use of an acid, such as citric acid, in combination with lecithin or butylated hydroxyanisole as an antioxidant composition. See column 1, lines 51–55, and column 2, lines 18–25. This patent teaches that citric acid should be placed directly into the edible oil. This patent also appears to teach away from the use of its invention with soy oil. See column 2, lines 53–55.

U.S. Pat. No. 3,947,602, was issued to Clewell et al. on Mar. 30, 1976, and is entitled "TREATMENT OF COOKING OIL." This patent teaches that citric acid may be used to extend the life of fryer oil. See column 1, lines 27–32. The Clewell method, however, is rather complex and requires a rather extensive apparatus. See column 2, lines 15–27. In addition, the oil being cleaned must be bubbled through a water/citric acid solution. See column 3, lines 2–6 Clewell also discloses diatomaceous earth to remove various contaminants. See column 2, lines 31–40.

U.S. Pat. No. 4,330,564, was issued to Friedman on May 18, 1982, and is entitled "FRYER OIL TREATMENT COMPOSITION AND METHOD." This patent discloses a method of treating edible oil with a solution containing two to ten percent of a food-compatible acid in connection with other components. See column 3, lines 36–37. Citric acid is said to be such a food compatible acid. See column 5, lines 9–15. A combination of citric acid with these other components, such as water and pumicite, has an antioxidant effect when immersed in the oil for from one-quarter to four minutes. See column 5, lines 9–14 and 24–31. The oil must then be filtered, however, to remove the antioxidant. See column 5, line 31.

U.S. Pat. No. 4,349,451 was issued to Friedman on Sept. 14, 1982, and is entitled "FRYER OIL TREATMENT COMPOSITION AND METHOD." This patent is based upon the same parent application and discloses the same invention as that disclosed in the above Friedman '564 patent. The '451 patent claims the antioxidant composition for treating the oil, whereas the '564 patent claims the method for treating that oil using that composition.

U.S. Pat. No. 4,363,823 was issued to Kimura et al. on Dec. 14, 1982, and is entitled "METHOD OF FRYING FOODS IN THE PRESENCE OF A SPICE ANTIOXIDANT." This patent discloses the use of a processed spice added to a frying oil for extending its life. As one example, the spice may be mixed with ethanol and then extracted by reflux. See column 4, lines 17–21. Diatomaceous earth or activated carbon removes colorants. See column 2, lines 47–50, and column 4, lines 27–35. The adsorbent is then filtered off. See column 2, lines 52–55, and column 4, lines 31–35.

The resulting antioxidant may then be added to a frying oil. See column 3, lines 24–25. According to the disclosure, this antioxidant is suited for use with various oils, including soybean oil. See column 3, lines 27–31. Pure antioxidant may be added directly to the edible oil. Alternatively, a relatively high concentration of the antioxidant may be put into a small amount of oil, and this antioxidant-containing oil is then placed into the larger amount of pure oil. See column 3, lines 36–40.

U.S. Pat. No. 4,803,077 was issued to Mitsuhashi et al. on Feb. 7, 1989, and is entitled "PROCESS TO PREPARE SOLID PRODUCTS CONTAINING OIL-SOLUBLE SUBSTANCE." This patent discloses a product that is solid, but soluble in edible oil. See column 6, lines 19–24, and column 4, lines 25–40. The product appears to be useful as a spice and is not deemed relevant to this invention. See Example II, column 4, lines 25-40. Other uses are listed at column 3, lines 64-68.

U.S. Pat. No. 4,806,374 was issued to Willemse on Feb. 21, 1989, and is entitled "FAT PRODUCT WITH IMPROVED PROPERTIES." This patent discloses the use of citrus oils to reduce smoke in edible oils. See column 1, lines 53-58, and column 3, lines 22-33. This patent also discloses the use of clove oil and the like for this same purpose. See column 3, line 29. In each case, the citrus or clove oil is added directly to the cooking oil to be treated. See column 5, lines 5-15, Example III.

U.S. Pat. No. 4,880,652 was issued to Regutti on Nov. 14, 1989, and is entitled "METHOD OF FILTERING EDIBLE LIQUIDS." This patent discloses a closed packet for the treatment of edible cooking oil. The packet is not disclosed as being perforated, but is instead evidently made of a porous material. See column 5, lines 1-3. This packet is filled with a filtration media comprising approximately 70% synthetic, hydrated, amorphous silica and 30% magnesium oxide. Column 5, lines 33-35. The patent suggests mixing a palmate or tocopherol antioxidant with the filter media. Part of the antioxidant is said to pass from the packet into the spent cooking oil during the rejuvenating process. See column 5, lines 53-57. The filtration media of Regutti is apparently caked, i.e., brought together in a mass. As a result, the 70% synthetic, hydrated, amorphous silica and the 30% magnesium oxide have a relatively small surface for a given weight. Thus, oil passing through the packet is exposed to less of the surface area of the silica/magnesium oxide combination, rendering the combination less effective for its intended purpose.

Other patents indicating the state of the art include U S. Pat. No. 4,913,921, issued to Schroeder et al. on Apr. 3, 1990, and entitled "FOOD PRODUCTS CONTAINING FISH OILS STABILIZED WITH FRUCTOSE;" and U.S. Pat. No. 4,913,922, issued to Hawkes et al. on Apr. 3, 1990, and entitled "METHOD FOR TREATMENT OF COOKING OIL."

SUMMARY OF THE INVENTION

The invention is a packet for the cleansing of edible oils. The packet comprises a sealed enclosure formed of a perforated or porous polymeric material. Granulated peelings or rinds from a fruit are inserted into that enclosure.

More particularly, the invention is an immersible packet for cleansing of a heated cooking oil. The packet comprises a sealed enclosure formed from an oil-porous material. The packet and its material may be immersed in the heated cooking oil for at least thirty minutes at temperatures of at least 350° Fahrenheit. An antioxidant is provided by and carried with the ground rind of a fruit, which rind contains citric acid and ascorbic acid. This rind substantially fills the enclosure, and also contains a volatile essential oil.

The porous material has pores large enough to permit release of water vapor from within the enclosure, but small enough to prevent escape of rind pieces through the material. In this way, when the packet is immersed in the heated cooking oil, the packet inhibits accelerated generation of free fatty acids and other organic contaminants. At the same time, the essential oil is volatilized to produce a pleasing aroma in the immediate area.

Preferably, the immersible packet contains the ground rind of a fruit having a citric acid content of between about 0.95% and 1.40%, and an ascorbic acid content of between 0.52 mg/ml and 0.60 mg/ml. These are the citric and ascorbic acid contents of various citrus fruit varieties, including such oranges and grapefruits as oroville sweet, standard sour, Duncan grapefruit, rough lemon, sampson tangelo, Cleopatra mandarin, trifoliate orange, savage citrange, and valencia cuttings. As other examples, the fruit may be selected from the group comprising lemons, limes, and mandarins.

The immersible packet of the invention may be rendered shelf stable by a variety of methods. For example, the packet may be irradiated, microwave sterilized, and vacuum packaged, thereby extending its shelf life.

A preferred material for the packet of the invention is a perforated or porous polymeric material. The most desirable polymeric material is a polyester.

A second aspect of the invention is the method of cleansing this edible oil, at an elevated temperature, using this packet. This method comprises immersion of the perforated or porous, citrus peeling-containing polymeric packet into the edible oil. The perforated packet is retained in the edible oil for at least five minutes. During the time that the packet is immersed, the edible oil can flow through the perforated or porous polymeric packet and contact the citrus peelings within that packet. After a suitable period of time, the perforated or porous polymeric packet is removed from the edible oil.

A further aspect of the method invention comprises precleaning or prefiltering the edible oil. In this precleaning or prefiltering step, the edible oil is first filtered through a cellulosic filter which has been impregnated with ground spices. Preferably, the ground spices are ground peppercorns or cloves.

It is an object of the invention to provide a device for stabilizing a heated cooking oil through the use of an antioxidant carried in a natural fruit product. This antioxidant inhibits the accelerated generation of free fatty acids and other organic contaminants. A further object of the invention is to provide a device for the volatilization of the essential oils from the fruit rind to produce a pleasing aroma in the commercial kitchen environment.

Thus, the device must provide an agent which has a sufficiently high ascorbic acid and citric acid content to inhibit free fatty acid formation, and a sufficiently high amount of essential oils to produce the desired pleasing aroma. By cleaning oxidants from edible oils, the useful life of those oils is extended.

It is a further object of this invention to provide a device for cleaning oil which is inexpensive, and which may be used by all persons, regardless of their technical training or background. It is another object of the invention to provide a device for cleaning edible oil which does not impart into that oil impurities which themselves need to be removed.

DETAILED DESCRIPTION OF THE PREFERRED EMBODIMENT

The invention is an immersible packet for the cleansing of edible, heated cooking oils. As may best be seen in FIG. 1, one preferred form of this packet 10 is a sealed enclosure formed of an oil porous material, such as a pair of superimposed polymeric sheets 12 and 14. This polymeric material should be resistant to temperatures of at least 350° Fahrenheit, for at least thirty minutes. Each of the sheets 12 and 14 has a dimension of eight inches by eight inches. A preferred polymer for these sheets is a polyester.

Although this preferred embodiment is shown, it will be understood that other forms of packets would also accomplish the objects of this invention. One such alternate form of packet is a packet like that of the preferred embodiment, but having depth, i.e., a packet having a generally cubic or other three-dimensional shape.

Another alternate form of packet has a configuration like that of the so-called "flo-thru" tea bag. This configuration has a generally triangular shape, when viewed from the side, which effectively increases the cross-sectional area of the packet. This in turn increases the exposure of the edible oil to the citrus peelings inside the packet, and should shorten the time necessary for the packet to perform its function.

Figure 1:
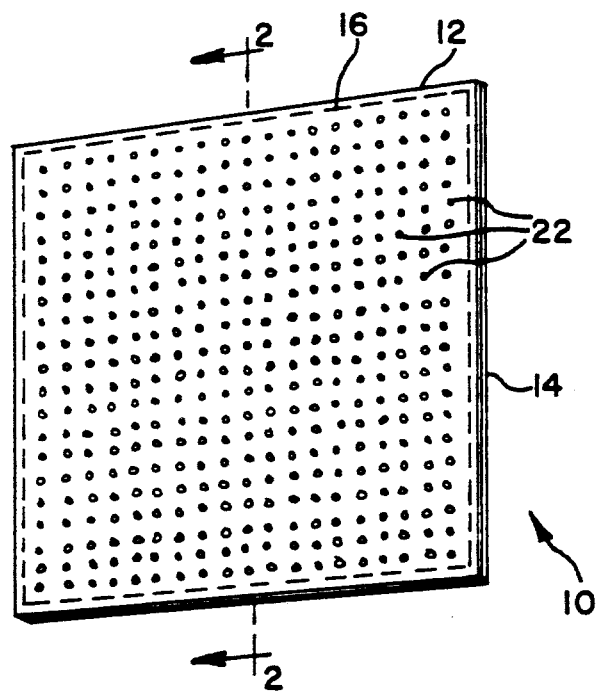
FIG. 1 is a perspective view of a packet in accordance with the invention.
Figure 2:
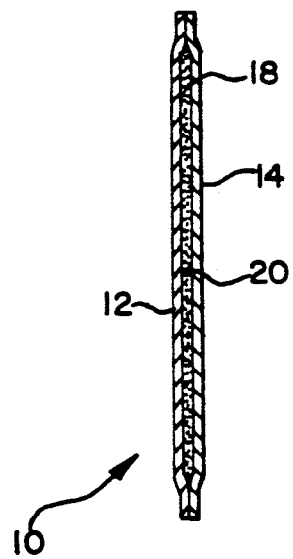
FIG. 2 is a side view of the packet of FIG. 1.

Returning now to the preferred embodiment of FIG. 1, the sheets 12 and 14 may be secured along their peripheries by sewing with short stitches 16. However, any means of securement which retains the contents within the packet 10 will be suitable. In this way, as may be seen in FIG. 2, the sheets 12 and 14 of the packet 10 form a sealed enclosure 18.

This enclosure 18 contains an antioxidant carried with the granulated peelings or ground rind 20 from a fruit, such as a citrus fruit. The fruit contains citric acid and ascorbic acid, preferably with a citric acid content of between about 0.95% and 1.40%, and an ascorbic acid content of between 0.52 mg/ml and 0.60 mg/ml. Although citrus fruits are preferred, any other fruit having this combination of citric acid and ascorbic acid is suitable for the invention.

The rind also contains a volatile essential oil. This granulated peeling or ground rind 20 may be formed by grinding or comminuting the whole or partial rinds of any suitable fruit, including but not limited to oranges, lemons, limes, mandarins, or the preferred citrus fruit, grapefruit. Preferably, eight to ten ounces of ground grapefruit or other citrus peelings are placed in the enclosure 18. As the peelings are a natural food product, the packet will be usable in edible oils without the need for approval of governmental authorities, such as the federal Food and Drug Administration ("FDA").

The peelings 20 may be inserted into the packet in any number of suitable ways. Preferably, the peelings 20 are inserted through the open side of a packet 10 which has been secured on three of its four sides. Alternatively, sheet 12 may be placed onto a surface, and then the peelings may be placed on top of that sheet 12. Sheet 14 may then be overlaid on the sheet 12 and peelings 20, and the sheets 12 and 14 are then sewn together. Other similar methods of forming the packet will be apparent.

As indicated above, the packet 10 is a sealed enclosure formed from an oil-porous material. As an example of an oil-porous material, the present embodiment shows the polymeric sheets with a plurality of perforations 22. The size of these perforations 22 is not critical, provided certain criteria are met. First, the perforations 22 must be sufficiently large to permit the free flow of hot, edible oil into and out of the packet. Second, the perforations must be sufficiently large to permit release of water vapor and volatilized essential oil from within the enclosure. Third, the perforations must be sufficiently small to prevent the ground or comminuted peelings from passing through the pores in the material, leaving the enclosure 18, and entering the oil being treated.

A second example of an oil-porous material is one without visible perforations. One such suitable porous material is manufactured by DuPont. This material has pores no larger than about 100 microns. In the embodiment having pores of this size, the ground rind 20 should have a mesh size sufficiently large that it will not pass through the pores of the material.

The finished packet 10 is preferably stored in a freezer, or in the freezer section of a refrigerator Keeping the packet 10 in the freezer section will extend its shelf life. Shelf life may also be extended by briefly irradiating the packet 10 in a microwave oven.

A second aspect of the invention is the method of cleansing this heated edible oil, using this packet 10. The frozen packet 10 may be removed from the freezer, and then immersed into 325° to 475° Fahrenheit edible oil.

When the packet is first immersed, the cold air within that packet 10 expands rapidly, and steam is generated as a result of the water in the rinds. This causes the packet to inflate rapidly, and to take on a balloon-like appearance. During the continued immersion over the next several minutes, a type of time-release distillation process occurs, in which a combination of citric acids, essential oils, and organic chemical compounds is released into the edible oils.

The perforated packet 10 is retained in the edible oil for a period of time, preferably at least five minutes and as long as thirty minutes. After the packet is used once, it should be discarded.

A new frozen packet 10 should be periodically placed in the oil, depending upon the extent of use of the oil. In heavy duty, continuous use, such as in restaurants, a packet should be placed in the edible oil approximately once every four hours. The inventor has found that in heavy duty, continuous commercial use of oils, the use of the packets 10 of the invention can extend the useful life of the oil up to two to three times beyond the life of untreated oil. The potential savings in edible oil consumption and the potential decrease in waste disposal are self-evident.

One of the advantages of the invention is that during the use of these packets, a strong and distinctly sweet citrus scent is released into the ambient air. This scent overcomes and eradicates the objectionable odor that is inherent in heavy-duty food frying processes. A further advantage of the invention is that no citrus or acidic flavor is imparted either to the food, or to the oil in which the food is fried.

Moreover, because its life is extended, commercial establishments have less economic incentive to use excessively deteriorated oil. As a result, the consumer should benefit by obtaining food that is less "greasy," and that has a consistently better flavor.

Figure 3:
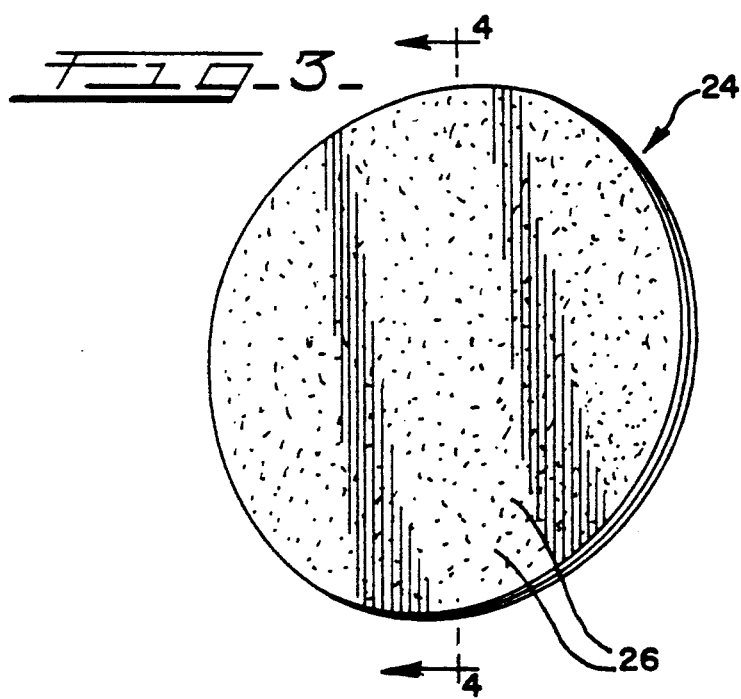
FIG. 3 is a perspective view of a cellulosic filter which has been impregnated with ground spices.

A further aspect of the method invention includes precleaning or prefiltering of the edible oil. In this precleaning or prefiltering step, the edible oil is first passed through a cellulosic filter 24 (FIG. 3) which has been impregnated with ground spices 26. Disposable filters, in the form of either calendared sheet or cartridges, are suitable.

Figure 4:
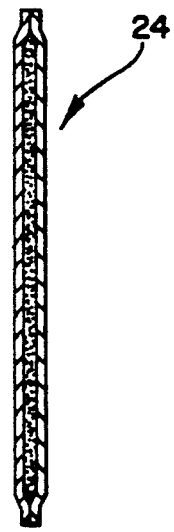
FIG. 4 is a side view of the packet of FIG. 3.

Preferably, the ground spices 26 are ground peppercorns or cloves. The ground spices 26 can be interspersed throughout a suitable filter media 24 (FIG. 4)

with either diatomaceous earth or man-made silica derivatives such as Magnesol XL or other suitable non-carcinogenic compounds, or natural filter cake media such as diatomaceous earth. Other natural spices, such as allspice, ginger, pepper, nutmeg, mace, cinnamon, sage, and paprika are also believed suitable for the invention. Such spice-impregnated filters significantly inhibit the rate of free fatty acid formation in edible oils, and thereby extend the useful life of those oils.

It may be seen from the above description that the invention is a device for cleaning oxidants from edible oils, thereby extending the useful life of those oils. The device is inexpensive, and simple enough to be used by all persons, regardless of their technical training or background.

While the specific embodiments have been illustrated and described, numerous modifications come to mind without markedly departing from the spirit of the invention. The scope of protection is thus only intended to be limited by the scope of the accompanying claims.

What I claim is:

1. An immersible packet for cleansing of a heated cooking oil, said packet comprising:
   a sealed enclosure formed from an oil porous material, said material when immersed in the heated cooking oil for at least thirty minutes being stable against heated oil to temperatures of at least 350° Fahrenheit;
   an antioxidant carried with the ground rind of a fruit, said fruit containing citric acid and ascorbic acid, said rind containing a volatile essential oil, said ground rind substantially filling said enclosure; and
   said porous material having pores large enough to permit release of water vapor from within said enclosure, but small enough to prevent escape of rind pieces through said material;
   such that when immersed in said heated cooking oil said packet inhibits accelerated generation of free fatty acids and other organic contaminants while volatilizing said essential oil to produce a pleasing aroma.

2. The immersible packet of claim 1, wherein said fruit has a citric acid content of at between 0.95% and 1.40%, and an ascorbic acid content of between 0.52 mg/ml and 0.60 mg/ml.

3. The immersible packet of claim 2, wherein said fruit is selected from the group comprising: oranges, lemons, limes, mandarins and grapefruits.

4. The immersible packet of claim 1, wherein said packet is shelf stable.

5. The immersible packet of claim 4, wherein said packet is frozen, irradiated, microwave sterilized, and vacuum packaged, thereby extending its shelf life.

6. The immersible packet of claim 4, wherein said packet is microwave irradiated.

7. The immersible packet of claim 1, wherein said material is a perforated polymeric material.

8. The immersible packet of claim 7, wherein said polymeric material is a polyester.

9. A packet for the cleansing of edible oils, said packet comprising:
   a sealed enclosure formed of a perforated or porous, polymeric material; and
   granulated peelings from a citrus fruit for insertion into said enclosure.

10. The packet of claim 9, wherein said polymeric material is a polyester.

11. The packet of claim 9, wherein said granulated peelings from a citrus fruit are granulated grapefruit peelings.

12. The packet of claim 9, wherein said packet is frozen.

13. A method of cleansing a heated edible oil at an elevated temperature, comprising:
   immersing a perforated polymeric packet containing citrus or other fruit peelings into said edible oil;
   retaining said perforated packet in said edible oil for at least five minutes so that said edible oil can flow through said perforated polymeric packet; and
   removing said perforated polymeric packet from said edible oil.

14. The method of claim 13, further comprising a precleaning step in which said heated edible oil is first filtered through a cellulosic filter which has been interspersed through a filter media with ground spices.

15. The method of claim 14, wherein said ground spices comprise ground peppercorns or ground cloves.

16. A cellulosic filter for the precleaning of edible oil, said filter being interspersed through a filter media with ground spices.

17. The filter of claim 16, wherein said ground spices comprise ground peppercorns or ground cloves.

18. A method of cleansing a heated cooking oil with an immersible packet, said packet comprising a sealed enclosure formed from an oil porous material, wherein an antioxidant is carried with the ground rind of a fruit within said packet, said fruit containing citric acid and ascorbic acid, said rind containing a volatile essential oil, said method comprising immersing said packet in said heated cooking oil whereby said packet inhibits accelerated generation of free fatty acids and other organic contaminants while volatilizing said essential oil to produce a pleasing aroma.

19. The method of claim 18, wherein said fruit has a citric acid content of between about 0.95% and 1.40%, and an ascorbic acid content of between 0.52 mg/ml and 0.60 mg/ml.

20. The method of claim 19, wherein said fruit is selected from the group comprising: oranges, lemons, limes, mandarins and grapefruits.

21. The method of claim 18, wherein said packet is frozen.

22. The method of claim 18, wherein said packet is microwave irradiated.

23. A packet for the cleansing of edible oils, said packet comprising:
   a sealed enclosure formed of a perforated or porous, polymeric material; and
   granulated peelings from an agent having a sufficiently high ascorbic acid and citric acid content to inhibit free fatty acid formation for insertion into said enclosure.

24. The packet of claim 23, wherein said polymeric material is a polyester.

25. The packet to of claim 23, wherein said granulated peelings are granulated grapefruit peelings.

26. The packet of claim 23, wherein said packet is frozen.

* * * * *

UNITED STATES PATENT AND TRADEMARK OFFICE
CERTIFICATE OF CORRECTION

PATENT NO. : 5,068,115
DATED : November 26, 1991
INVENTOR(S) : Benno E. Liebermann It is certified that error appears in the above-identified patent and that said Letters Patent is hereby corrected as shown below:

Column 2, line 16, after "2-6" insert --.--.

Column 4, line 12, after "may" insert --be--.

Column 6, line 13, after "refrigerator" insert --.--.

Column 7, Claim 2, line 45, after "of" delete "at".

Column 8, Claim 25, line 62, delete "to".

Signed and Sealed this

Twenty-seventh Day of April, 1993

Attest:

MICHAEL K. KIRK

*Attesting Officer*          *Acting Commissioner of Patents and Trademarks*